US010384533B2

(12) United States Patent
Lo

(10) Patent No.: US 10,384,533 B2
(45) Date of Patent: Aug. 20, 2019

(54) FASTENING METHOD FOR COMPONENTS

(71) Applicant: THUNDER POWER NEW ENERGY VEHICLE DEVELOPMENT COMPANY LIMITED, Central (HK)

(72) Inventor: Yu-An Lo, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 15/348,763

(22) Filed: Nov. 10, 2016

(65) Prior Publication Data

US 2017/0057377 A1    Mar. 2, 2017

Related U.S. Application Data

(60) Division of application No. 14/967,374, filed on Dec. 14, 2015, which is a continuation of application No. 14/746,866, filed on Jun. 23, 2015.

(Continued)

(51) Int. Cl.
B32B 3/24         (2006.01)
B60K 11/08        (2006.01)
(Continued)

(52) U.S. Cl.
CPC ............ B60K 11/085 (2013.01); B32B 7/05 (2019.01); B32B 15/00 (2013.01); B60H 1/00278 (2013.01); B60H 1/00392 (2013.01); B60H 1/00564 (2013.01); B60H 1/00885 (2013.01); B60H 1/143 (2013.01); B60H 1/2215 (2013.01); B60K 1/04 (2013.01); B60K 11/04 (2013.01);
(Continued)

(58) Field of Classification Search
CPC . B32B 3/266; B32B 7/045; Y10T 428/24347; F16B 3/005
USPC ......................................................... 428/139
See application file for complete search history.

(56) References Cited

U.S. PATENT DOCUMENTS 3,723,215 A    3/1973 Kessler
4,157,427 A    6/1979 Ferber
(Continued)

FOREIGN PATENT DOCUMENTS

DE    3837701 A1    5/1990
EP    1 386 828 A2   2/2004
(Continued)

OTHER PUBLICATIONS

Extended European Search Report dated Jul. 29, 2016, for European Patent Application No. 16160387.3, all pages.
(Continued)

Primary Examiner — William P Watkins, III
(74) Attorney, Agent, or Firm — Kilpatrick Townsend & Stockton LLP

(57) ABSTRACT

Methods for fastening or coupling dissimilar materials to each other may include providing a first component with a first through hole and a second component with a second through hole that is at least partly aligned with the first through hole. A mixture including a first material and a second material may be injected into the aligned through holes of the first component and the second component. The mixture of the first material and the second material may expand in the through holes, e.g., due to a chemical reaction, thereby connecting the first component and the second component together.

13 Claims, 3 Drawing Sheets

Related U.S. Application Data

(60) Provisional application No. 62/150,848, filed on Apr. 22, 2015, provisional application No. 62/133,991, filed on Mar. 16, 2015.

(51) Int. Cl.

| | | |
|---|---|---|
| *B32B 7/05* | (2019.01) | |
| *B60H 1/00* | (2006.01) | |
| *B60K 11/04* | (2006.01) | |
| *F16B 11/00* | (2006.01) | |
| *B32B 15/00* | (2006.01) | |
| *F16B 3/00* | (2006.01) | |
| *F16B 5/04* | (2006.01) | |
| *H01M 10/625* | (2014.01) | |
| *H01M 10/63* | (2014.01) | |
| *H01M 10/6568* | (2014.01) | |
| *H01M 10/663* | (2014.01) | |
| *B60H 1/14* | (2006.01) | |
| *B60H 1/22* | (2006.01) | |
| *B60K 1/04* | (2019.01) | |
| *H01M 10/48* | (2006.01) | |
| *B60L 58/24* | (2019.01) | |
| *B60L 58/27* | (2019.01) | |
| *B60L 50/64* | (2019.01) | |
| *B60K 1/00* | (2006.01) | |

(52) U.S. Cl.
CPC .............. *B60L 50/64* (2019.02); *B60L 58/24* (2019.02); *B60L 58/27* (2019.02); *F16B 3/005* (2013.01); *F16B 5/04* (2013.01); *F16B 11/00* (2013.01); *H01M 10/486* (2013.01); *H01M 10/625* (2015.04); *H01M 10/63* (2015.04); *H01M 10/6568* (2015.04); *H01M 10/663* (2015.04); *B60K 2001/005* (2013.01); *B60K 2001/006* (2013.01); *F16B 11/006* (2013.01); *H01M 2220/20* (2013.01); *Y02T 10/705* (2013.01); *Y02T 10/7005* (2013.01); *Y10T 428/24347* (2015.01)

(56) References Cited

U.S. PATENT DOCUMENTS

| | | |
|---|---|---|
| 4,693,652 A | 9/1987 | Sweeney |
| 5,830,308 A | 11/1998 | Reichard |
| 5,940,949 A | 8/1999 | Rink |
| 6,096,403 A | 8/2000 | Wycech |
| 6,272,809 B1 | 8/2001 | Wycech |
| 6,335,078 B2 | 1/2002 | Venkataramani et al. |
| 7,335,205 B2 | 2/2008 | Aeschlimann et al. |
| 8,556,558 B1 | 10/2013 | Hunt |
| 2004/0105949 A1 | 6/2004 | Krause |
| 2004/0195833 A1 | 10/2004 | Zoellner |
| 2007/0261787 A1 | 11/2007 | Malis |
| 2008/0029919 A1 | 2/2008 | Howe et al. |
| 2010/0028018 A1 | 2/2010 | Tan et al. |
| 2012/0070701 A1 | 3/2012 | Gaben |
| 2012/0091964 A1 | 4/2012 | Vance et al. |
| 2013/0249317 A1 | 9/2013 | Kang et al. |
| 2015/0008931 A1 | 1/2015 | Sugeno et al. |
| 2016/0271905 A1 | 9/2016 | Lo |
| 2016/0271926 A1 | 9/2016 | Lo |
| 2017/0259490 A1 | 9/2017 | Lo |

FOREIGN PATENT DOCUMENTS

| | | |
|---|---|---|
| EP | 2565959 A2 | 3/2013 |
| EP | 2725684 A1 | 4/2014 |
| JP | 3331529 B2 | 10/2002 |
| JP | 2010057316 A1 | 3/2010 |
| JP | 2010273417 A | 12/2010 |
| JP | 2012192543 A | 10/2012 |
| JP | 2013162597 A1 | 8/2013 |
| WO | 2011/067646 A1 | 6/2011 |
| WO | 2012/105448 A1 | 8/2012 |
| WO | 2013/015162 A1 | 1/2013 |

OTHER PUBLICATIONS

European Search Report for EP 16 16 0467 dated Jul. 22, 2016, all pages.
U.S. Appl. No. 14/967,374, filed Dec. 14, 2015 Non-Final Rejection dated Jul. 13, 2016, all pages.
U.S. Appl. No. 14/967,374, filed Dec. 14, 2015 Final Rejection dated Nov. 3, 2016, all pages.
U.S. Appl. No. 14/967,374, filed Dec. 14, 2015 Non-Final Rejection dated Feb. 22, 2017 all pages.
Non-Final Office Action dated Aug. 10, 2016 in the corresponding U.S. Appl. No. 14/746,866.
Non-Final Office Action dated Jun. 29, 2018 in the corresponding U.S. Appl. No. 15/608,707.
U.S. Appl. No. 14/967,374, filed Dec. 14, 2015 Non-Final Rejection dated Jan. 31, 2018, all pages.
U.S. Appl. No. 14/746,866, filed Jun. 23, 2015 Non-Final Rejection dated Jul. 14, 2017, all pages.
U.S. Appl. No. 14/746,866, filed Jun. 23, 2015 Final Rejection dated Feb. 7, 2018, all pages.
Final Office Action dated May 4, 2018 in the corresponding U.S. Appl. No. 14/967,374.

FASTENING METHOD FOR COMPONENTS

CROSS-REFERENCE TO RELATED APPLICATIONS

The present application is a division of Non-Provisional U.S. application Ser. No. 14/967,374, filed Dec. 14, 2015, which is a continuation of Non-Provisional U.S. application Ser. No. 14/746,866, filed Jun. 23, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of which are hereby incorporated by reference in their entireties for all purposes.

BACKGROUND

Exemplary embodiments of the present disclosure relate to component fastening technologies, lightweight fastening methods for components, and assemblies that may be used, for example, for an electric vehicle.

Technology related to the fastening of dissimilar materials has become increasingly widespread throughout various industries and applications, including the automobile and aircraft industries, for example. However, one difficulty in the fastening of dissimilar materials is caused by galvanic corrosion. The phenomenon of galvanic corrosion is induced due to the difference in potentials of different metal materials when brought into contact in the presence of an electrolyte (e.g., water). In such a situation, a corrosion current is generated due to the difference in electric potentials of the dissimilar metal materials. When galvanic corrosion occurs, the strength of the joint point between the dissimilar metal materials weakens, thereby causing unexpected damage.

To address this problem, many different techniques are used, including riveting, locking, and the like. Most of these techniques, however, are inconvenient and cause further problems, for example, the weight of the work piece may be increased by adding the extra fasteners, or looseness may occur due to insufficient joining fastness.

SUMMARY

Exemplary embodiments of the present disclosure may address at least some of the above-noted problems. For example, according to first aspects of the disclosure, lightweight fastening methods for components may include one or more of the following steps: providing first component and a second component, the first component and the second component respectively provided with through holes; aligning the through holes of the first component the second component; forming a mixture by mixing a first material with a second material; and injecting the mixture of the first material and the second material into the aligned through holes of the first component and the second component. In some examples, the mixture of first material and the second material may expand in the through holes, e.g., due to a reaction, thereby connecting the first component and the second component together.

According to further aspects of the disclosure, an integrally fastened assembly may be formed including a first component with a first through hole, and a second component with a second through hole. During assembly, the first through hole on the first component may be aligned with the second through hole on the second component, and a connecting component may be arranged in the aligned first through hole and the second through hole. In some examples, the connecting component may be formed by injecting the mixture of a first material and a second material into the aligned through holes of the first component and the second component, and the mixture of the first material and the second material may expand in the through holes due to a chemical reaction, thereby connecting the first component and the second component together.

In some embodiments, two kinds of glues may be mixed in the aligned through holes of the components. As the two kinds of glues are mixed, a chemical reaction may occur causing the resultant mixture to expand and solidify. After the solidifying is complete, a cap bolt may be formed, which serves to fasten, connect, or couple the two components together. As a result, the strength of the joint point between the components may be improved and the weight of the working components may not be significantly increased.

In addition, compared with riveting techniques in the related art, when the components to be fastened are made from dissimilar metal materials, the cap bolt formed the example embodiments of the present disclosure may eliminate or reduce abrasion, falling off, or chipping of the anti-corrosion cladding material provided on the working components. For example, the hardness of the formed cap bolt may be low, and thus, the formed cap bolt may not chip the anti-corrosion cladding material off of the components. As such, galvanic corrosion induced by the presence of an electrolyte, e.g., water, on the surfaces of the components where the anti-corrosion cladding material may have otherwise chipped or fallen off may be prevented, or inhibited, from occurring.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1A:
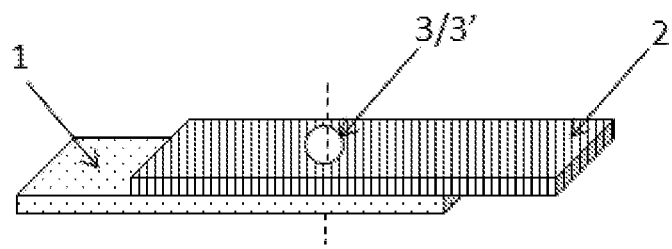
FIG. 1A-FIG. 1D are perspective structural schematic views showing a process of the lightweight fastening method for components, according to an exemplary embodiment of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1A-FIG. 1D are perspective structural schematic views showing a process of the lightweight fastening method for components, according to an example embodiment of the present disclosure.

As shown in FIG. 1A, a first component 1 and a second component 2 are components to be fastened together. The first component 1 and the second component 2 are respectively provided with a first through hole 3 and a second through hole 3'. Further, the first through hole 3 of the first component 1 and the second through hole 3' of the second component 2 are aligned with each other. In some examples, the first component 1 and second component 2 may be made from dissimilar materials, such as dissimilar metal materials, or other combinations of dissimilar materials. For example, the first component 1 and the second component 2 may be made from dissimilar metal materials generally used in the automotive industry, such as steel, aluminum, alloys, etc.

Figure 1B:
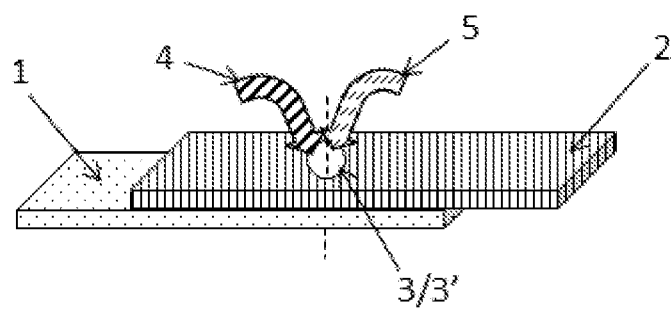

Referring to FIG. 1B, a first material 4 is mixed with a second material 5 to form a mixture 6. This may be done outside of first through hole 3 and second through hole 3', inside of first through hole 3, and/or inside of second through hole 3'.

Figure 1C:
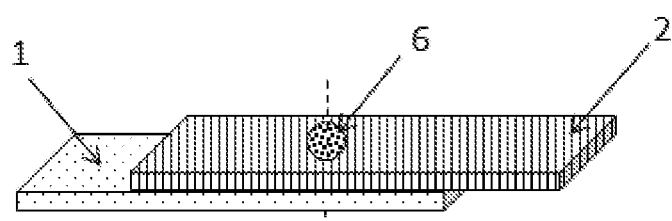

As shown in FIG. 1C, the mixture 6 may be injected into the aligned through holes 3, 3' of the first component 1 and the second component 2.

Figure 1D:
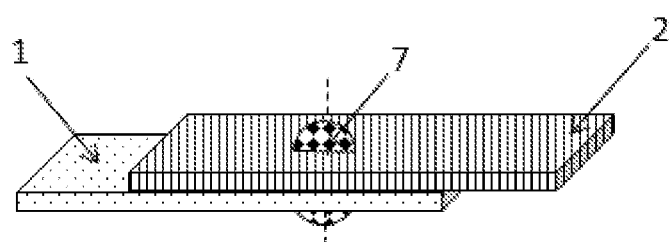

As shown in FIG. 1D, the mixture 6 may expand in the through holes 3, 3' e.g., due to a chemical reaction, thereby forming a cap bolt having an outer edge 7. The outer edge 7 may have an area greater than the area of the through holes, so that the first component 1 and the second component 2 are fastened or coupled together by the outer edge 7 of the expanded mixture 6. In particular, referring to FIG. 1D, the mixture 6 expands outwardly on both sides of the first and second components, thereby forming a cap bolt on an upper portion of the second component 2 and a lower portion of the first component 1.

As described above, the mixture 6 may include the first material 4 and the second material 5. In some examples, the first material 4 may include isocyanate, however, the first material 4 is not limited to the aromatic isocyanate group, such as diphenylmethane diisocyanate and toluene diisocyanate, or the aliphatic isocyanate group, such as hexamethylene diisocyanate and isophorone diisocyanate. Further, the second material 5 may include polyol, however, the second material 5 is not limited to the polyether group, such as polyethylene glycol and polytetrahydrofuran, or the polyester group. Additionally, the mixture is not limited to the first material 4 and the second material 5. In another example embodiment of the present disclosure, the mixture 6 may include other materials in addition to the first material 4 and the second material 5. In some examples, the mixture 6 may be an epoxy resin, a liquid and/or a solution that hardens based on a chemical reaction of the materials, exposure to air or other gas, exposure to energy, and/or combinations thereof.

FIG. 2A-FIG. 2D are cross-sectional structural schematic views showing additional details of a lightweight fastening method for components, according to an example embodiment of the present disclosure. The fastening process as shown in FIG. 2A-FIG. 2D may be similar to, or the same as, the process shown in FIG. 1A-FIG. 1D. However, FIG. 2A-FIG. 2D present the process by illustrating cross-sectional views.

Figure 2A:
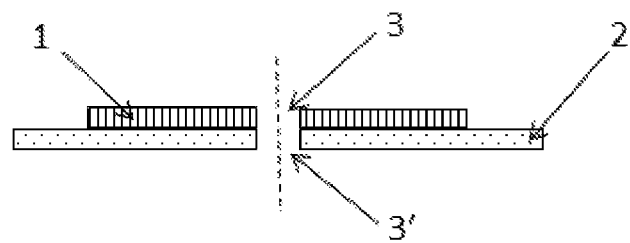
FIG. 2A-FIG. 2D are cross-sectional structural schematic views showing a process of the lightweight fastening method for components, according to an exemplary embodiment of the present disclosure.

Referring to FIG. 2A, the first through hole 3 of the first component 1 is aligned with the second through hole 3' of the second component 2 to form aligned through holes 3,3'.

Figure 2B:
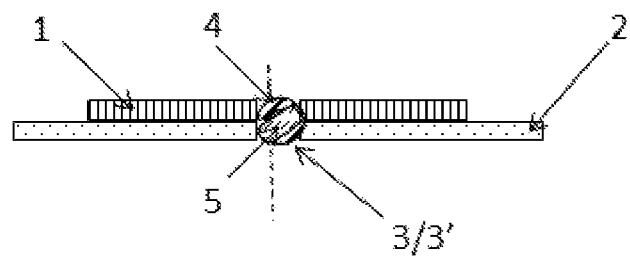

In FIG. 2B, a mixture (e.g., formed by mixing the first material 4 with the second material 5) may be injected into the through holes 3,3'.

Figure 2C:
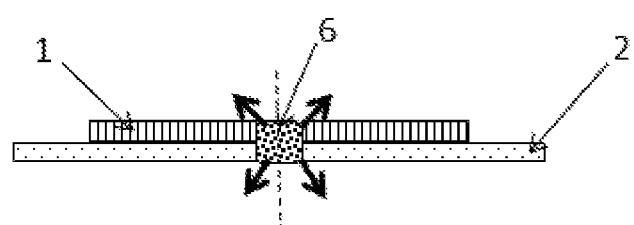

As shown in FIG. 2C, the materials in the mixture 6 may generate (alone or in combination with other materials) a chemical reaction that expands the mixture outwardly along the arrows as shown in FIG. 2C.

Figure 2D:
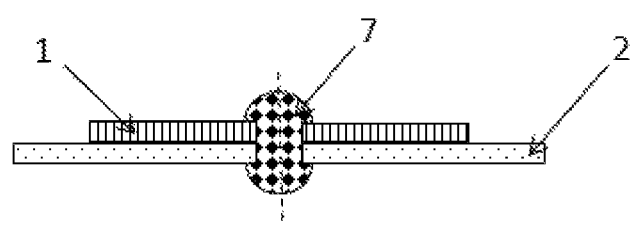

Further, as shown in FIG. 2D, after expanding, the mixture 6 may directly form an outward extending edge 7 (e.g., a cap bolt) with an area greater than an area of the through holes 3,3' so as to directly fasten or couple the first component 1 and the second component 2. After solidifying to a solid state, the cap bolt is formed after solidifying to fasten the two working components, and the fastening strength at the joint point of the first component 1 and the second component 2 may be improved. Further, the cap bolt may be relatively lightweight, e.g., so that it will not add extra weight to the working components.

It should be noted that, although shown as substantially similar in shape and size, the through holes 3, 3' may take many different forms and need not be similarly shaped or sized. For example, one of the through holes may be wider, tapered, or otherwise differently sized or shaped compared to the other through hole. As will be appreciated in looking, for example, at FIG. 2D, a monolithic (i.e., formed as a single piece) connecting component, such as connecting component 7, may be disposed at least partially in the first through hole and the second through hole, and include a first expanded portion that is wider than the first through hole and a second expanded portion that is wider than the second through hole. In some examples, such as when one or both of the through holes are tapered, the expanded portion outside of the through holes may be omitted and/or removed.

In addition, the hardness of the cap bolt formed by the mixture 6 may be relatively low compared to the materials in first component 1, second component 2, and/or any cladding or other coating affixed to or formed on the components. As such, the formed cap bolt may prevent, or reduce, for example, abrasion, falling off, or chipping of the anti-corrosion cladding material provided on the first component 1 and second component 2. As a result, the galvanic corrosion induced by the presence of an electrolyte (e.g., water) on the surfaces of the components where the anti-corrosion cladding material may have otherwise chipped or fallen off may be prevented, or inhibited, from occurring.

Figure 3:
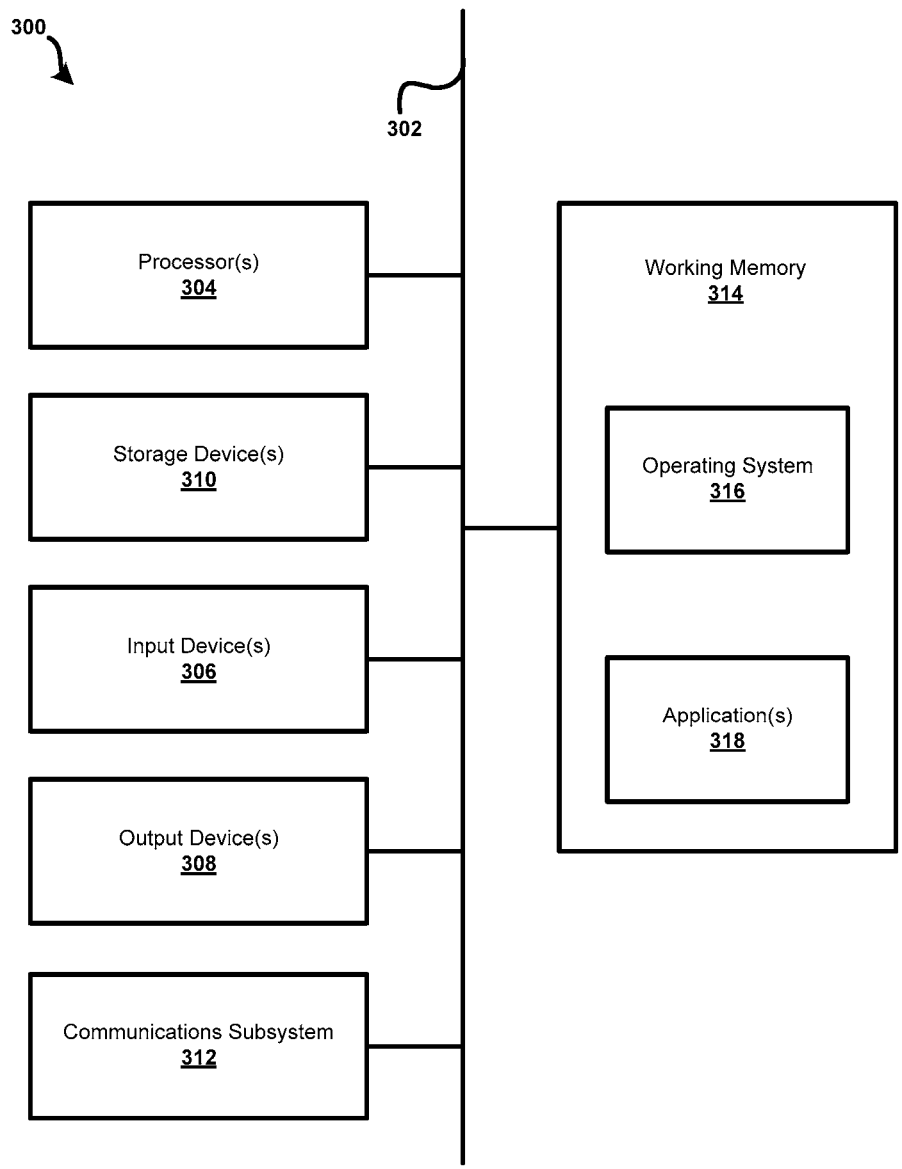
FIG. 3 shows an example block diagram for a computing system upon which various features of the present disclosure may be provided.

Referring now to FIG. 3, an example block diagram for a computer system or other onboard computer device 300 which may be operatively connected to the motor rotor assembly, the gear box, and/or any other components described above and provided by the electric vehicle is shown. It is contemplated that the computer system or other onboard computer device 300 may control one or more aspects of the electric vehicle and/or features described above. In some examples, the computer system or other onboard computer device 300 may include a tablet computer, personal data assistant, smartphone, gaming console, and/or a dedicated computer system for controlling the electric vehicle. Any particular one of the previously-described computing devices may be wholly or at least partially configured to exhibit features similar to the computer system 300.

The computer device 300 is shown comprising hardware elements that may be electrically coupled via a bus 302 (or may otherwise be in communication, as appropriate). The hardware elements may include a processing unit with one or more processors 304, including without limitation one or more general-purpose processors and/or one or more special-purpose processors (such as digital signal processing chips, graphics acceleration processors, and/or the like); one or more input devices 306, which may include without limitation a steering wheel, a climate control button or other user input receiving buttons, and/or the like; and one or more output devices 308, which may include without limitation a presentation device (e.g., a computer screen), a GPS, and/or the like.

The computer system 300 may further include (and/or be in communication with) one or more non-transitory storage devices 310, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 300 might also include a communications subsystem 312, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 312 may permit data to be exchanged with a network (such as the network described below, to name one example), other computer systems, and/or any other devices described herein. In many embodiments, the computer system 300 will further comprise a working memory 314, which may include a random access memory and/or a read-only memory device, as described above.

The computer device 300 also may comprise software elements, shown as being currently located within the working memory 314, including an operating system 316, device drivers, executable libraries, and/or other code, such as one or more application programs 318, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 310 described above. In some cases, the storage medium might be incorporated within a computer system, such as computer system 300. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 300 and/or might take the form of source and/or installable code, which, upon compilation and/or installation on the computer system 300 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 300) to perform methods in accordance with various embodiments of the disclosure. According to a set of embodiments, some or all of the procedures of such methods are performed by the computer system 300 in response to processor 304 executing one or more sequences of one or more instructions (which might be incorporated into the operating system 316 and/or other code, such as an application program 318) contained in the working memory 314. Such instructions may be read into the working memory 314 from another computer-readable medium, such as one or more of the storage device(s) 310. Merely by way of example, execution of the sequences of instructions contained in the working memory 314 may cause the processor(s) 304 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 300, various computer-readable media might be involved in providing instructions/code to processor(s) 304 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 310. Volatile media may include, without limitation, dynamic memory, such as the working memory 314.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 304 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 300.

The communications subsystem 312 (and/or components thereof) generally will receive signals, and the bus 302 then might carry the signals (and/or the data, instructions, etc. carried by the signals) to the working memory 314, from which the processor(s) 304 retrieves and executes the instructions. The instructions received by the working memory 314 may optionally be stored on a non-transitory storage device 310 either before or after execution by the processor(s) 304.

It should further be understood that the components of computer device 300 can be distributed across a network. For example, some processing may be performed in one location using a first processor while other processing may be performed by another processor remote from the first processor. Other components of computer system 300 may be similarly distributed. As such, computer device 300 may be interpreted as a distributed computing system that performs processing in multiple locations. In some instances, computer system 300 may be interpreted as a single computing device, such as a distinct laptop, desktop computer, or the like, depending on the context.

Although the present invention has been described with reference to the specific embodiments shown in the drawings, it should be understood that the motor rotor assembly and the electric vehicle motor provided by the present invention can have a variety of variations without departing from the spirit, scope and background of the present invention. Those of ordinary skill in the art should be still aware that, parameters in the embodiments disclosed by the present invention are changed in different manners, for example, sizes, shapes, elements or types of materials, and these changes shall fall within the spirit and scope of the present invention and the claims.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

What is claimed is:

1. A fastened assembly, comprising:
   a first component, wherein the first component is formed with a first through hole, the first component being planar and the first through hole being circular;
   a second component, wherein the second component is formed with a second through hole, the second component being planar and the second through hole being circular, and during assembly, the first through hole on the first component is aligned with the second through hole on the second component, the aligned through hole being a cylindrical cavity formed within the first component and the second component, wherein the first through hole and the second through hole have different sizes and shapes; and
   a connecting component arranged in the aligned first through hole and the second through hole, the connecting component being formed by:
   inserting a first material into the aligned through hole;
   inserting a second material into the aligned through hole;
   mixing, within the aligned through hole, the first material with the second material; and
   allowing the mixture of the first material and the second material to expand and hardens in the aligned through hole, thereby connecting the first component and the second component together as a cap bolt and a hardness of the mixture is lower than both a hardness of the first component and a hardness of the second component; and, wherein
   the first component and the second component are made of dissimilar metal materials.

2. The assembly of claim 1, wherein:
   the first material comprises isocyanate, and the second material comprises polyol.

3. The assembly of claim 1, wherein:
   the expansion of the mixture of the first material and the second material forms an outer edge with an area greater than an area of the through holes.

4. The assembly of claim 3, wherein:
   the first component and the second component are two components of an electric vehicle.

5. The assembly of claim 1, wherein:
   the first component comprises steel and the second component comprises aluminum.

6. An automotive assembly, comprising:
   a first auto body component formed with a first through hole, the first auto body component being planar and the first through hole being circular;
   a second auto body component formed with a second through hole that is at least partially aligned with the first through hole, the second auto body component being planar and the second through hole being circular, and the aligned through hole being a cylindrical cavity formed within the first component and the second component, wherein the first through hole and the second through hole have different sizes and shapes; and
   a monolithic connecting component disposed at least partially in the first through hole and the second through hole, the monolithic connecting component being formed from a hardened mixture of at least a first material and a second material, and including a first expanded portion that is wider than the first through hole and a second expanded portion that is wider than the second through hole as a cap bolt and a hardness of the mixture is lower than both a hardness of the first component and a hardness of the second component; and, wherein the first component and the second component are made of dissimilar metal materials.

7. The assembly of claim 1, wherein the hardened mixture is softer than at least one of the first component, the second component, or a cladding layer provided on the first or second components.

8. The assembly of claim 6, wherein the mixture of the first material and the second material has expanded in the through holes due to a chemical reaction.

9. The assembly of claim 6, wherein:
the first material comprises isocyanate, and the second material comprises polyol.

10. The assembly of claim 6, wherein the first expanded portion and the second expanded portion are formed via expansion of the mixture of the first material and the second material during hardening of the mixture.

11. The assembly of claim 10, wherein:
the first component and the second component are two components of an electric automobile.

12. The assembly of claim 6, wherein:
the first component comprises steel and the second component comprises aluminum.

13. The assembly of claim 6, wherein the mixture of the first material and the second material has expanded in the through holes due to a chemical reaction.

* * * * *